United States Patent
Hong et al.

(10) Patent No.: US 11,646,430 B2
(45) Date of Patent: May 9, 2023

(54) HEAT MANAGEMENT TYPE FUEL CELL HOT BOX CAPABLE OF CONTROLLING HEAT EXCHANGE AREA

(71) Applicant: Industry-Academic Cooperation Foundation, Yonsei University, Seoul (KR)

(72) Inventors: Jong Sup Hong, Seoul (KR); Ji Young Kim, Seoul (KR); Woo Seok Lee, Seoul (KR); Dong Young Yoon, Seoul (KR)

(73) Assignee: Industry-Academic Cooperation Foundation, Yonsei University, Seoul (KR)

(*) Notice: Subject to any disclaimer, the term of this patent is extended or adjusted under 35 U.S.C. 154(b) by 0 days.

(21) Appl. No.: 17/472,473

(22) Filed: Sep. 10, 2021

(65) Prior Publication Data
US 2022/0077478 A1  Mar. 10, 2022

(30) Foreign Application Priority Data

Sep. 10, 2020  (KR) ........................ 10-2020-0116163

(51) Int. Cl.
*H01M 8/04* (2016.01)
*H01M 8/04007* (2016.01)
*H01M 8/04014* (2016.01)
*H01M 8/2485* (2016.01)

(52) U.S. Cl.
CPC ... *H01M 8/04074* (2013.01); *H01M 8/04022* (2013.01); *H01M 8/2485* (2013.01)

(58) Field of Classification Search
CPC ..................... H01M 8/04074; H01M 8/04022
See application file for complete search history.

(56) References Cited

U.S. PATENT DOCUMENTS

2013/0011757 A1* 1/2013 Perry ................. H01M 8/0618
429/419

FOREIGN PATENT DOCUMENTS

| JP | 2007-191382 | 8/2007 |
|---|---|---|
| JP | 2007-314410 | 12/2007 |
| JP | 2008-001584 | 1/2008 |
| KR | 2009/0086008 | 8/2009 |

* cited by examiner

*Primary Examiner* — Olatunji A Godo
(74) *Attorney, Agent, or Firm* — Morrison & Foerster LLP

(57) ABSTRACT

The present disclosure relates to a fuel cell hot box for improving the system efficiency of a fuel cell, wherein all of a fuel cell stack part, an afterburner, a reformer, and an air-heat exchange unit are provided inside a main chamber, fuel may be reformed and preheated using heat of the fuel cell stack part and heat of combustion gas generated by the afterburner, and at the same time, air may be also preheated. Thus, wasting energy can be prevented, the lifetime of the entire system can be increased by cooling the fuel cell stack part and increasing the durability of the fuel cell stack part against thermal stress, and a plurality of fuel cell stack parts share the center chamber, thereby simplifying a configuration of the fuel cell hot box. Further, since the reformer is configured to be vertically slidable, a heat exchange area of the reformer may be controlled in a predetermined manner, and thus a flexible system that may adjust a reforming rate of the fuel according to an operation state of the fuel cell may be configured.

17 Claims, 10 Drawing Sheets

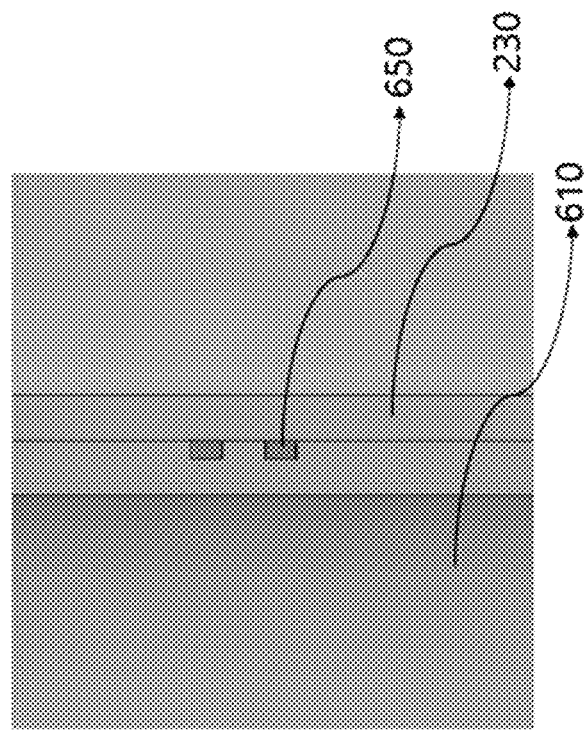
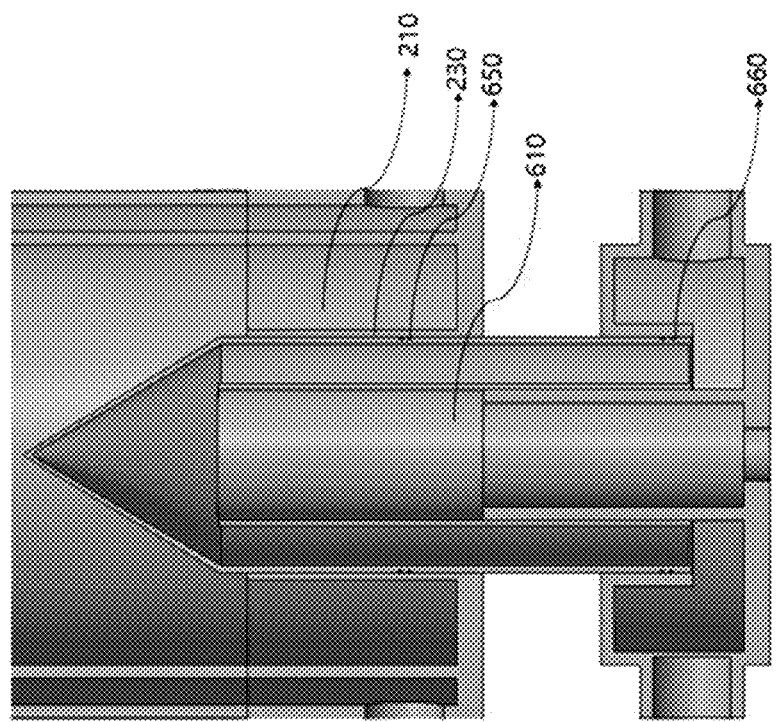
FIG. 9

HEAT MANAGEMENT TYPE FUEL CELL HOT BOX CAPABLE OF CONTROLLING HEAT EXCHANGE AREA

CROSS-REFERENCE TO RELATED APPLICATION

This application claims priority to and the benefit of Korean Patent Application No. 10-2020-0116163 filed on Sep. 10, 2020, the disclosure of which is incorporated herein by reference in its entirety.

BACKGROUND

1. Field of the Invention

The present disclosure relates to a heat management type fuel cell hot box capable of improving system efficiency by controlling a heat exchange area.

2. Discussion of Related Art

Solid oxide fuel cells (SOFCs) operated at a high temperature of 700° C. or higher are fuel cells that use a solid oxide (ceramics) with oxygen ion conductivity as an electrolyte and may use, as fuels, various hydrocarbon fuels such as natural gas, liquefied petroleum gas (LPG), propane, and butane and biofuels in addition to hydrogen.

An SOFC system includes system peripherals (balance of plants (BOPs)) such as a power conversion device, a blower and a pump for supplying reactants, a heat recovery system, and a control system. Thus, in order to improve the efficiency of the SOFC system, it is very important to design a system for heat insulation and thermal management in addition to improving the performance of system components such as fuel reformers and power converters as well as stacks.

In the SOFC system, heat is generated in a fuel cell stack, an afterburner, a heating reformer, and the like. In contrast, heat is required for a steam reformer, an evaporator, an air preheater, a fuel preheater, a hot water generation device, and the like. Thus, properly designing a heat exchange network by calculating the amount of heat generated in the system and the amount of heat required for the system and minimizing heat loss greatly affect the overall efficiency of the SOFC system. For efficient thermal management of the SOFC system, it is important to use heat generated from the stack during operation and heat obtained by burning unreacted fuel to supply heat necessary for maintaining the temperature of the stack, preheating and reforming of the fuel, and the like.

In this way, the SOFC system has advantages such as high system efficiency and freedom of fuel selection. However, since the SOFC system is operated at a high temperature of 700° C. or higher, components suitable for such an operation environment are required, and these components have high manufacturing costs and high maintenance costs. Further, the high-temperature operation environment causes the degradation of the performance and the reliability of durability in the long term due to the high degradation of the components.

SUMMARY OF THE INVENTION

Accordingly, the present disclosure is directed to providing a solid oxide fuel cell hot box in which an air-heat exchange unit and a reformer are arranged so that fuel and air having a low temperature are effectively preheated using heat of a high-temperature fuel cell stack part and heat of combustion gas. Thus, the system efficiency is increased through heat exchange, and at the same time, the fuel cell stack part is cooled effectively to alleviate the thermal gradient, thereby increasing the durability in the long term. Flexible operation may be achieved through a structural mechanism that may control a reforming rate of the fuel in a predetermined manner.

The present disclosure provides a fuel cell hot box including: a main chamber that has a first inner space, a first inlet, and an outlet formed therein; a center chamber that is located at a center of the first inner space and has a second inner space formed therein; an auxiliary chamber that is located below the main chamber and has a third inner space and a second inlet formed therein; and a reformer which is disposed at a center of the auxiliary chamber, of which at least a portion of an upper part is located in the second inner space, and which is vertically slidable, wherein the main chamber includes a plurality of fuel cell stack parts and an air-heat exchange unit, the plurality of fuel cell stack parts are located at the same distance from a center of the center chamber and arranged in the first inner space at regular intervals, the air-heat exchange unit is located between the plurality of fuel cell stack parts and the center chamber to connect the plurality of fuel cell stack parts and the first inlet, an afterburner is included in one side of the center chamber, the auxiliary chamber is connected to the main chamber through a connection pipe, and the reformer is connected to the second inlet and disposed to be spaced apart from the afterburner.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 9 is a view illustrating a sealing member in the fuel cell hot box according to one embodiment of the present disclosure.

DETAILED DESCRIPTION OF EXEMPLARY EMBODIMENTS

Figure 1:
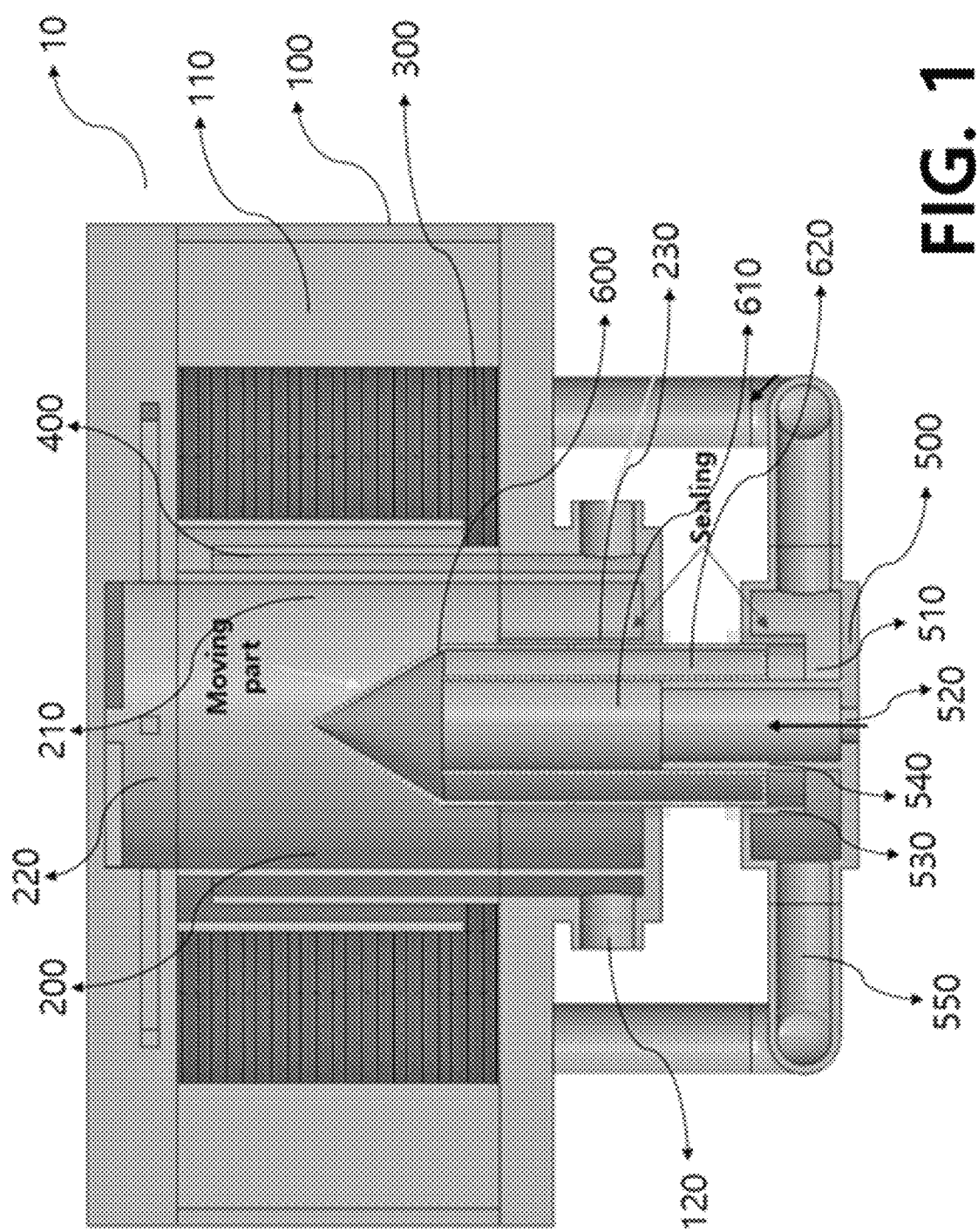
FIG. 1 is a view illustrating a configuration of a fuel cell hot box according to one embodiment of the present disclosure.

Hereinafter, the described disclosure may be variously modified and may have various embodiments and is thus intended to illustrate and describe specific embodiments in the accompanying drawings in detail. However, it should be understood that the described disclosure is not limited to a specific embodiment and includes all changes, equivalents, and substitutes included in the spirit and scope of the technology described below.

Terms such as first, second, A, and B may be used to describe various components, but the components are not limited by the above terms, and the terms are used only to distinguish one component from other components. For example, without departing from the scope of the technology described below, a first component may be referred to as a second component, and similarly, the second component may be referred to as the first component. The term "and/or" includes a combination of a plurality of related listed items or any of the plurality of related listed items.

In terms used in the present specification, it should be understood that singular expressions include plural expressions unless the context clearly indicates otherwise, and it should be understood that the term "include" is intended to mean that there are features, numbers, steps, operations, components, parts, or combinations thereof that are implemented and do not exclude the possibility of the presence or addition of one or more other features, numbers, steps, operations, components, parts, or combinations thereof.

Prior to a detailed description of the drawings, it should be clarified that the components in the present specification are merely classified according to main functions responsible for the components. That is, two or more components described below may be combined into one component or one component may be divided into two or more components according to more subdivided functions. Further, it is apparent that each of the components described below may additionally perform some or all of functions responsible for other components in addition to a main function responsible therefor, and some of the main functions responsible for the components may be exclusively performed by other components.

Further, in performing a method or an operation method, processes constituting the method may be performed differently from a specified order unless a specific order is clearly described in context. That is, the processes may be performed in the same order as the specified order, may be performed substantially simultaneously, or may be performed in a reverse order.

One aspect of the present disclosure provides a fuel cell hot box including: a main chamber that has a first inner space, a first inlet, and an outlet; a center chamber that is located at a center of the first inner space and has a second inner space formed therein; an auxiliary chamber that is located below the main chamber and has a third inner space and a second inlet formed therein; and a reformer which is disposed at a center of the auxiliary chamber, of which at least a portion of an upper part is located in the second inner space, and which is vertically slidable, wherein the main chamber includes a plurality of fuel cell stack parts and an air-heat exchange unit, the plurality of fuel cell stack parts are located at the same distance from a center of the center chamber and arranged in the first inner space at regular intervals, the air-heat exchange unit is located between the plurality of fuel cell stack parts and the center chamber to connect the plurality of fuel cell stack parts and the first inlet, an afterburner is included in one side of the center chamber, the auxiliary chamber is connected to the main chamber through a connection pipe, and the reformer is connected to the second inlet and disposed to be spaced apart from the afterburner.

In one embodiment of the present disclosure, the auxiliary chamber may be disposed so that a vertical central axis thereof coincides with a vertical central axis of the main chamber.

In another embodiment of the present disclosure, the central chamber may include a first guide member vertically extending to surround an upper side surface of the reformer, and the first guide member may guide the vertical movement of the reformer.

In still another embodiment of the present disclosure, the auxiliary chamber may include a second guide member vertically extending to surround a lower side surface of the reformer, and the second guide member may guide the vertical movement of the reformer.

In yet another embodiment of the present disclosure, the hot box may further include a control rod, and the control rod may be connected to the reformer, protrude outward from the hot box, and adjust the vertical movement of the reformer.

In yet another embodiment of the present disclosure, the control rod is connected to a driving device, and the driving device may vertically move the reformer using the control rod.

In yet another embodiment of the present disclosure, the reformer may have a side surface that is in contact with the first guide member and is surrounded by a first sealing member.

In yet another embodiment of the present disclosure, the reformer may have a side surface that is in contact with the second guide member and is surrounded by a second sealing member.

In yet another embodiment of the present disclosure, the air-heat exchange unit may have a bent passage and may connect the first inlet and the plurality of fuel cell stack parts.

FIGS. 1 to 10 illustrate a configuration of a hot box 10 according to one embodiment of the present disclosure. Hereinafter, the present disclosure will be described in more detail with reference to the accompanying drawings to help the understanding of the present disclosure. However, the following embodiments are merely provided for easier understanding of the present disclosure, and the contents of the present disclosure are not limited by the following embodiments.

Figure 2:
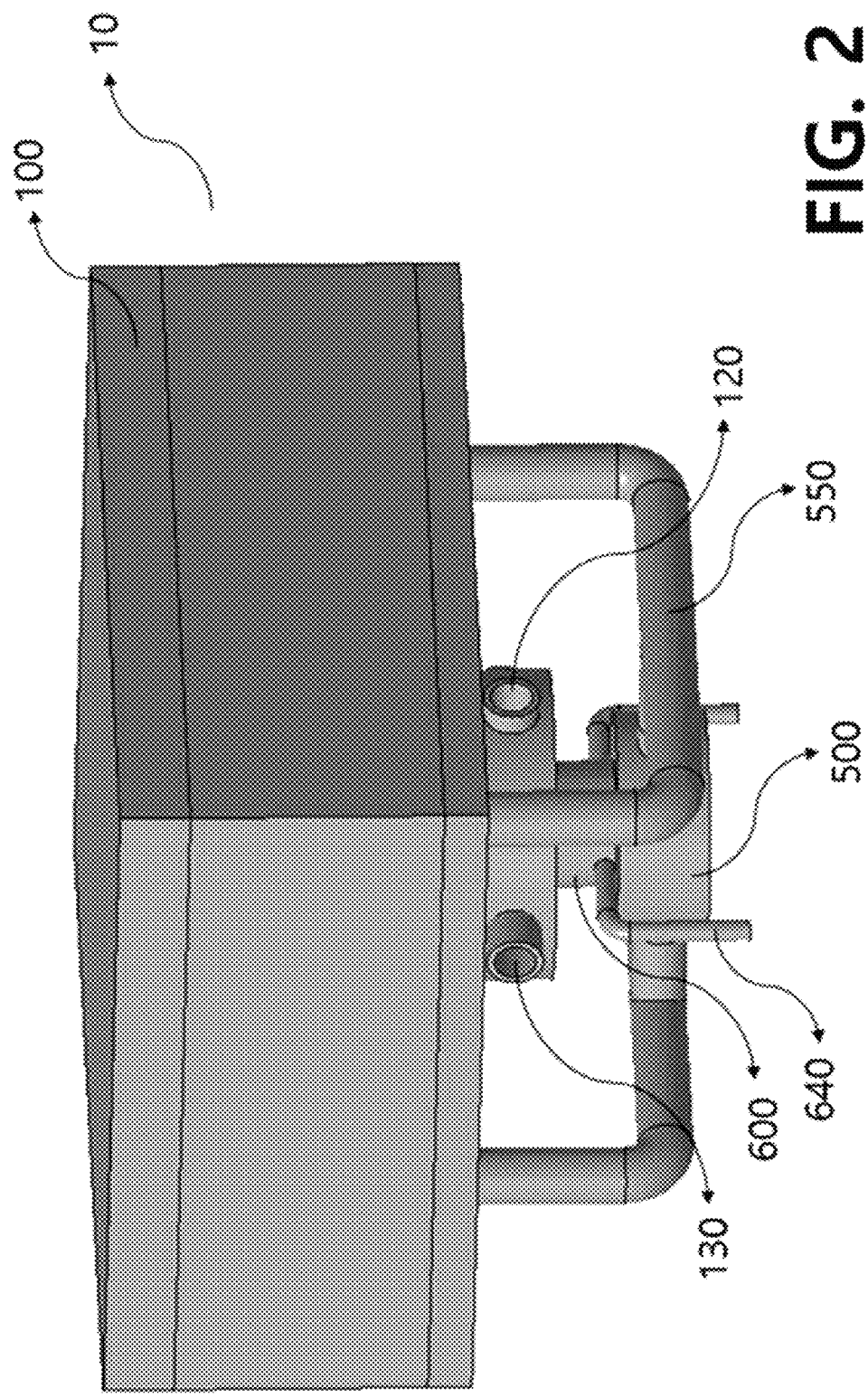
FIG. 2 is a perspective view illustrating an exterior of the fuel cell hot box according to one embodiment of the present disclosure.
Figure 3:
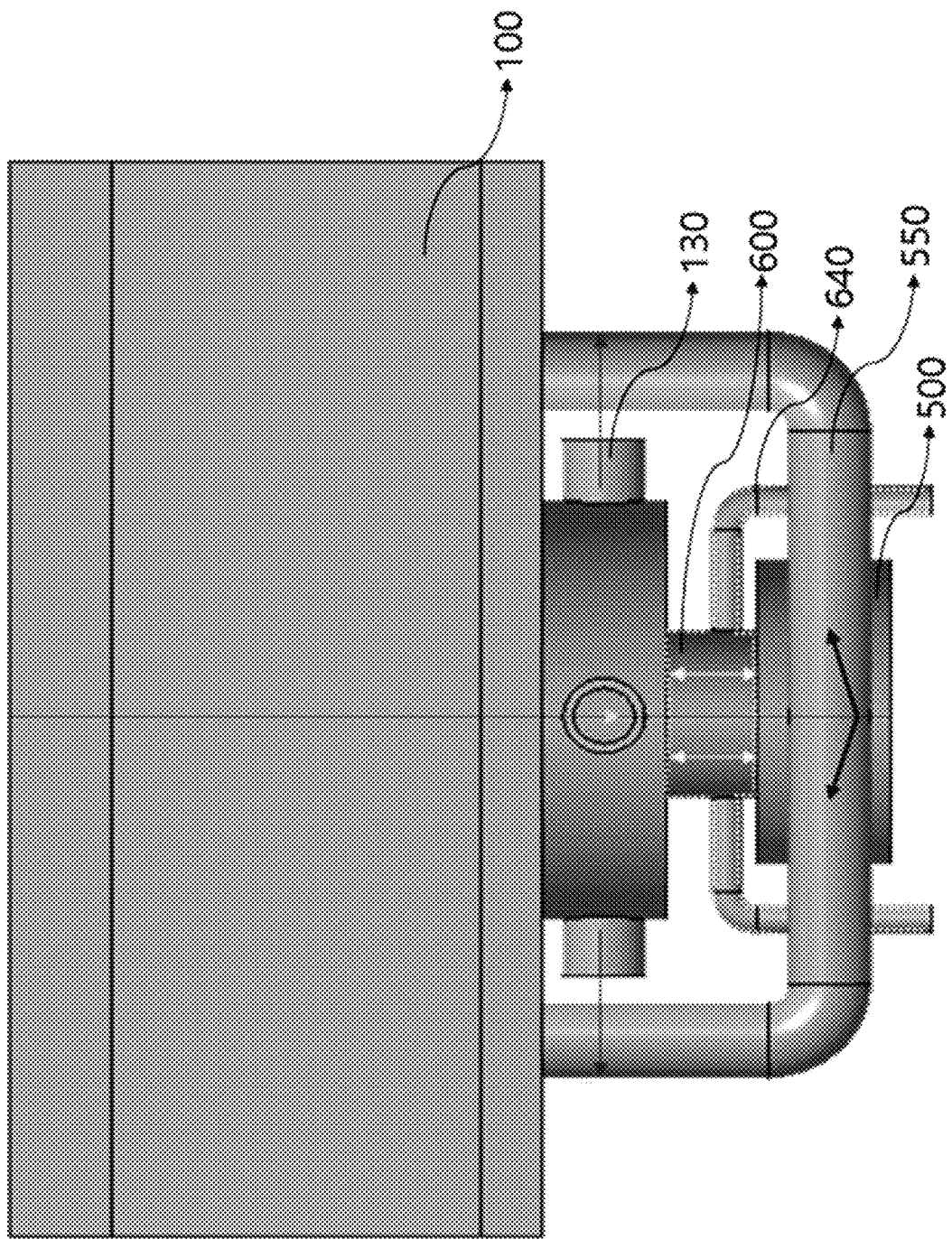
FIG. 3 is a side view illustrating the fuel cell hot box according to one embodiment of the present disclosure.
Figure 4:
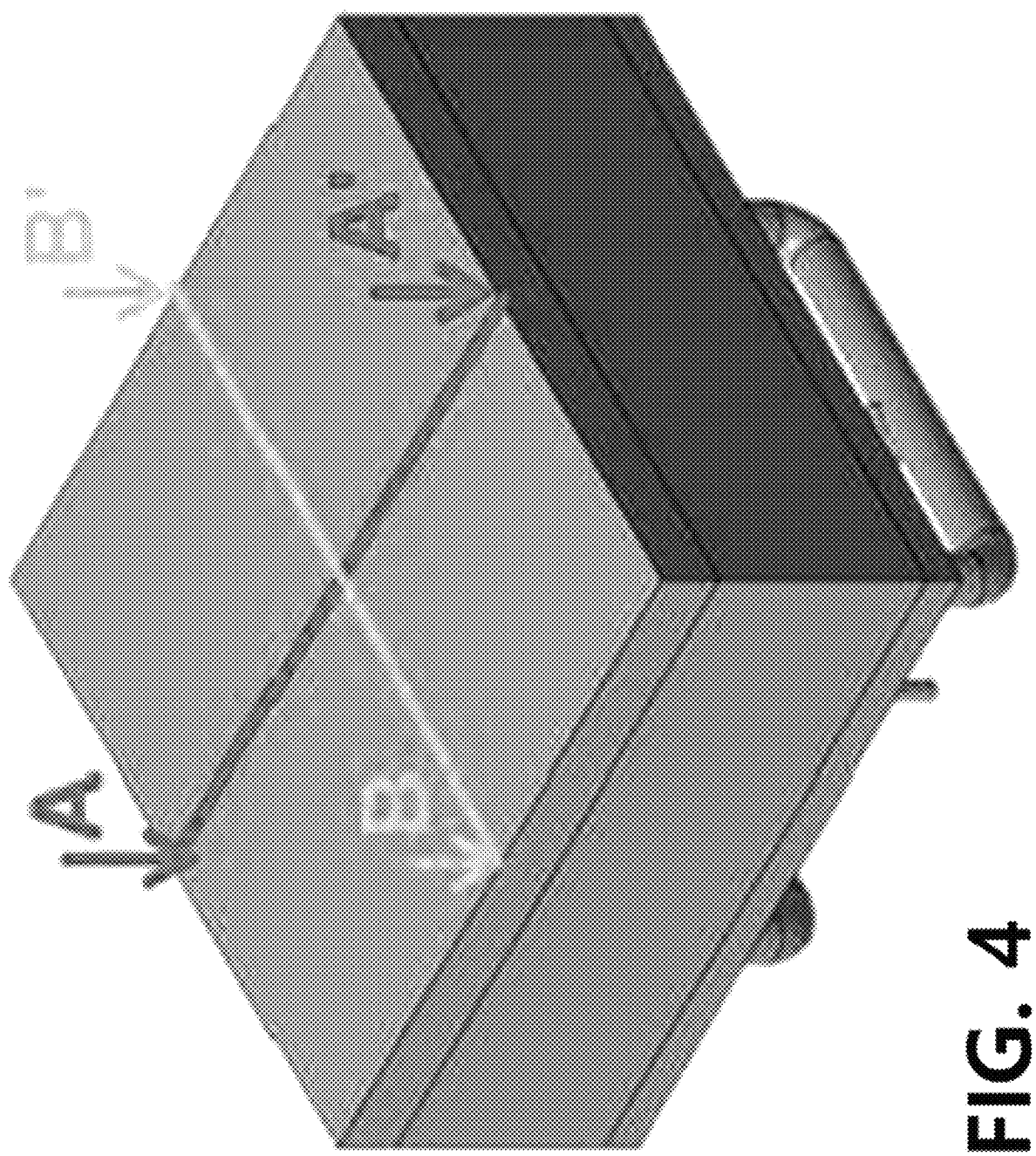
FIG. 4 is a diagram illustrating reference lines for cutting the fuel cell hot box to illustrate cross-sectional views of FIGS. 5 to 7.
Figure 5:
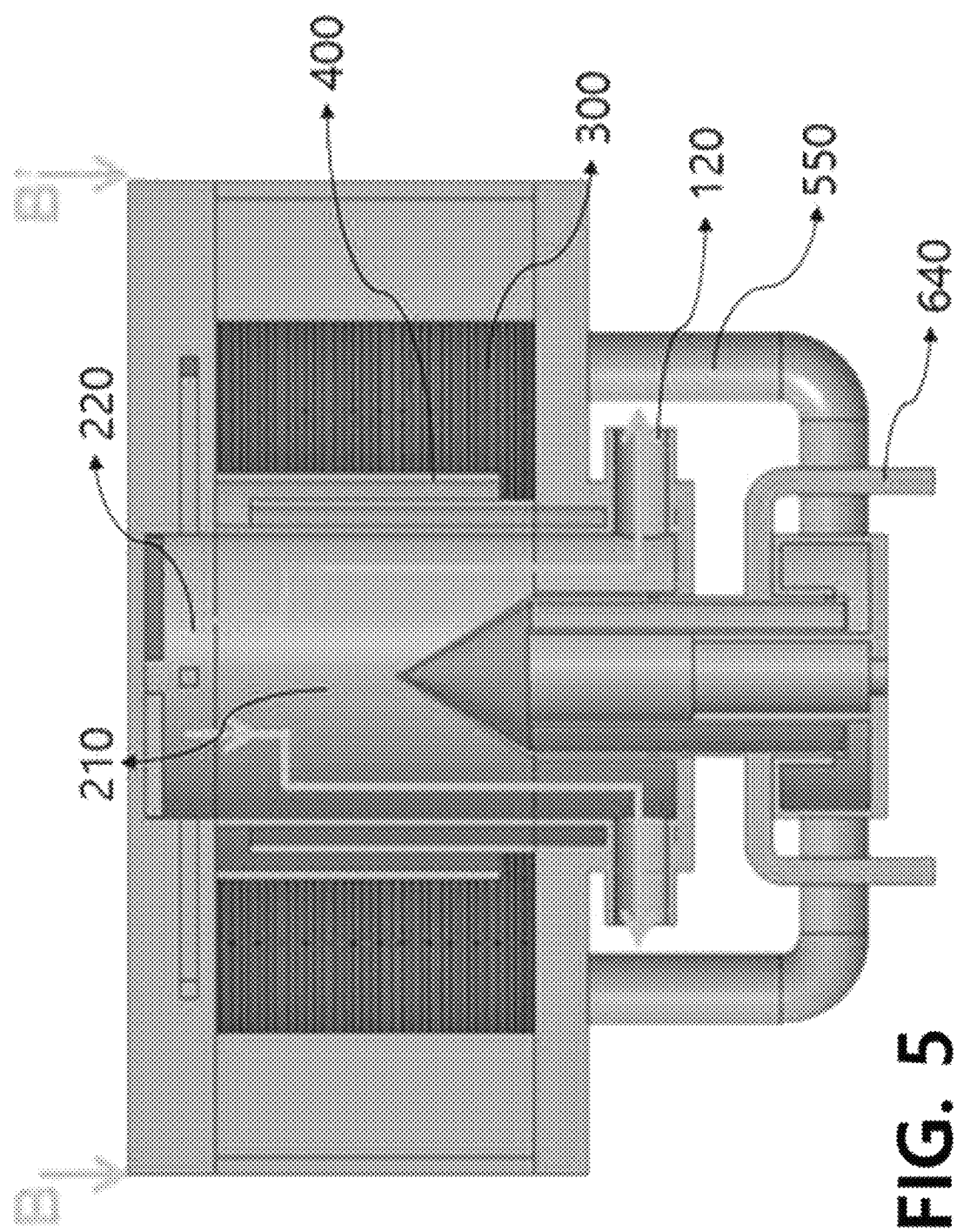
FIG. 5 is a cross-sectional view illustrating a movement path of combustion gas in the fuel cell hot box according to one embodiment of the present disclosure.
Figure 6:
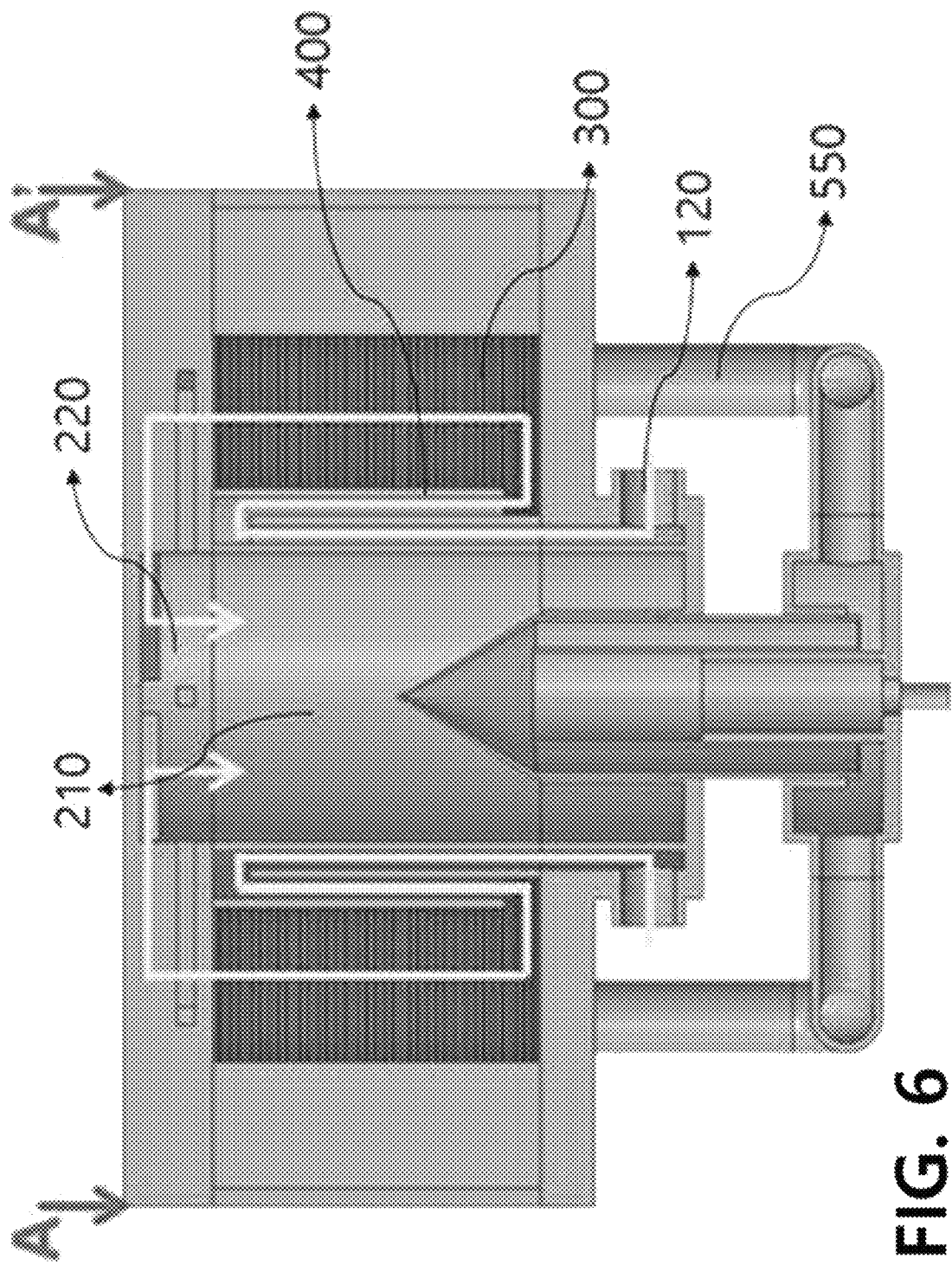
FIG. 6 is a cross-sectional view illustrating a movement path of air in the fuel cell hot box according to one embodiment of the present disclosure.
Figure 7:
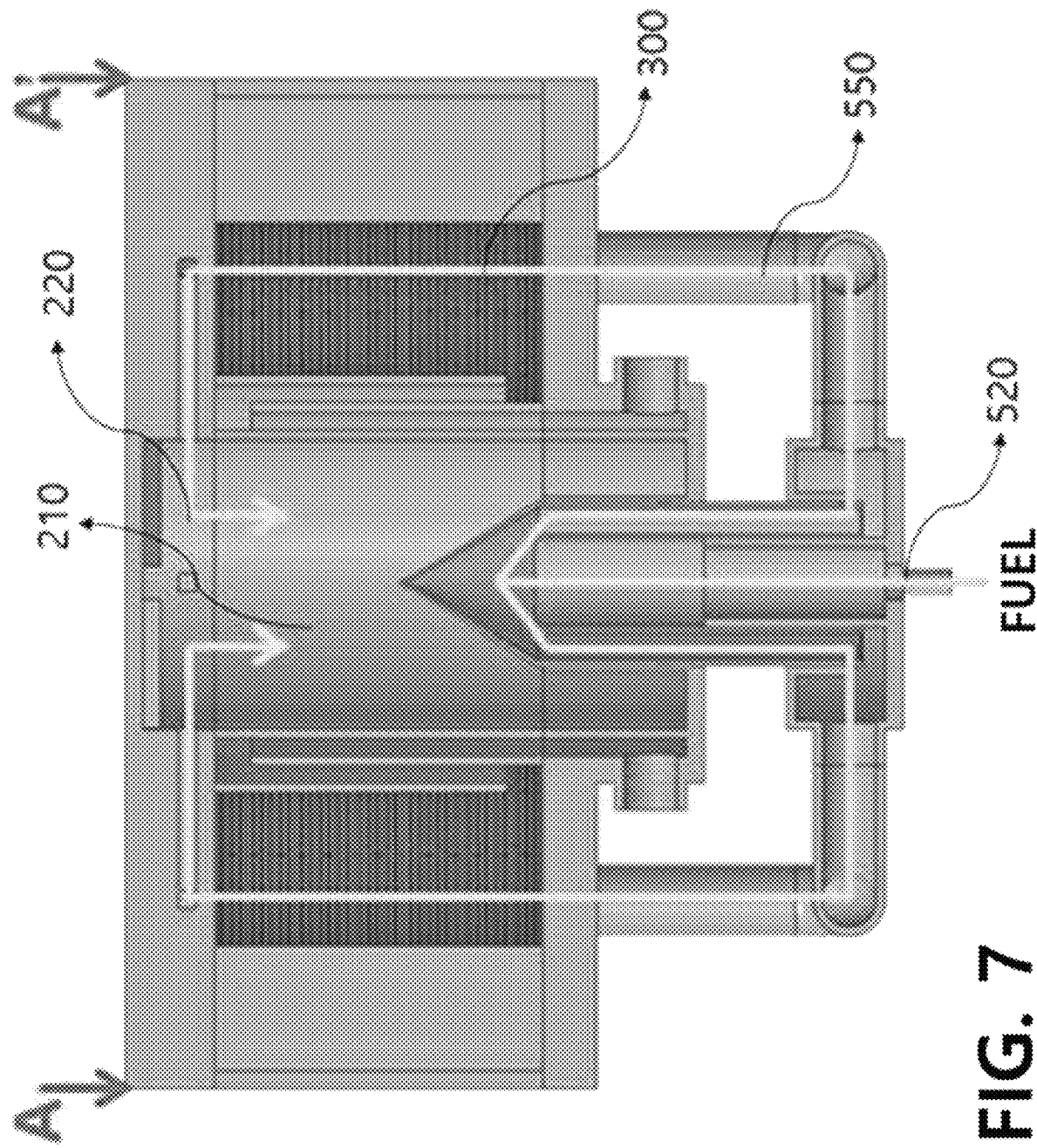
FIG. 7 is a cross-sectional view illustrating a movement path of fuel in the fuel cell hot box according to one embodiment of the present disclosure.

FIGS. 1 to 3 schematically illustrate a configuration of a fuel cell hot box 10 according to one embodiment of the present disclosure. Referring to FIGS. 1 to 3, the fuel cell hot box 10 according to the present disclosure includes a main chamber 100, a center chamber 200, a fuel cell stack part 300, an air-heat exchange unit 400, and an auxiliary chamber 500.

The main chamber 100 may be formed in a rectangular hexahedral shape. However, the present disclosure is not limited thereto, and the main chamber 100 may be formed in various shapes such as a square hexahedron, a rectangular hexahedron, and a cylinder. As illustrated in FIGS. 1 to 3, the main chamber 100 may include a first inner space 110, a first inlet 120, and an outlet 130. A heat insulation layer may be formed on the inner surface of the main chamber 100. The heat insulation layer may be made of a heat-resistant alloy material based on an Ni group, an Ni—Fe group, or a Co group to present damage due to a high temperature. A step may be formed in the center of the lower surface of the main chamber 100.

The first inner space 110 provides a space which is formed by the inside of the main chamber 100, in which the center chamber 200, the fuel cell stack part 300, and the air-heat exchange unit 400 are accommodated, and through which unreacted air and unreacted fuel passing through the stack part 300 may move to an inlet (not illustrated) of an afterburner 220. The first inner space 110 may be variously formed according to the shape and arrangement of the center chamber 200, the fuel cell stack part 300, and the air-heat exchange unit 400. The present disclosure is not limited thereto, and for example, the first inner space 110 may be formed as a hexahedral space.

The first inlet 120 may be formed on a side surface of the step in the center of the lower surface of the main chamber 100 and may be connected to the air-heat exchange unit 400. The first inlet 120 is a part into which air used for a fuel cell is introduced. A plurality of first inlets 120 may be provided according to the number and the capacity of the fuel cell stack parts 300, and in this case, the first inlet 120 may be connected to an air supply device to effectively inject air.

The outlet 130 may be formed on the side surface of the step in the center of the lower surface of the main chamber 100 and may connect the outside of the main chamber 100 and a second inner space 210 to communicate with each other. The second inner space 210 is a space excluding the afterburner 220 and a reformer 600 from the inside of the center chamber 200, and the outlet 130 helps combustion gas generated in the afterburner 220 to pass through the second inner space 210 and to be discharged to the outside of the main chamber 100. A plurality of outlets 130 may be provided according to the number and the capacity of the fuel cell stack part 300 and the capacity of the afterburner 220, and in this case, the outlet 130 may be connected to a combustion gas outlet device to effectively discharge the combustion gas. The first inlet 120 and the outlet 130 may be located adjacent to each other or opposite to each other in the step formed below the main chamber 100.

In one specific embodiment, the plurality of outlets 130 may be formed in the side surface of the step to face each other with respect to the step, and the first inlets 120 may be formed in the side surface of the step in a direction perpendicular to a direction of the outlets 130.

The center chamber 200 may be located at the center of the first inner space 110, and the plurality of fuel cell stack parts 300 may be arranged around the center chamber 200 and surrounded by the air-heat exchange unit 400. A lower surface of the center chamber 200 may be located at the step. The center chamber 200 may be formed in various shapes and sizes according to the capacity, the size, and the arrangement of the plurality of fuel cell stack parts 300. The present disclosure is not limited thereto, and the center chamber 200 may be formed in a quadrilateral column, a cylinder, or a polygonal column. Further, the center chamber 200 may separate air, fuel, and combustion gas introduced into the main chamber 100, the air may be preheated outside the center chamber 200, and the fuel may be preheated and reformed inside the center chamber 200. The center chamber 200 includes the second inner space 210, the afterburner 220, and the reformer 600, and the second inner space 210 is a space excluding the afterburner 220 and the reformer 600 and may accommodate the combustion gas generated by the afterburner 220. The combustion gas may be generated by the afterburner 220 of the center chamber 200 and may preheat the air and the fuel while passing through the second inner space 210 of the center chamber 200. The preheated and reformed fuel moves from the center chamber 200 along a connection pipe 550 to the plurality of fuel cell stack parts 300. That is, the plurality of fuel cell stack parts 300 may share the center chamber 200 and equally receive the reformed fuel. In this way, the plurality of fuel cell stack parts 300 may share the center chamber 200, and thus the entire configuration of the fuel cell hot box 10 can be simplified. Further, the center chamber 200 is heat-exchanged with the air-heat exchange unit 400. The side surface of the center chamber 200 is not limited thereto but may be made of, for example, a heat-resistant alloy material based on an Ni group, an Ni—Fe group, or a Co group containing a high thermal conductivity and heat resistance metal. Further, the center chamber 200 is connected to communicate with the outlets 130. Thus, the combustion gas generated in the center chamber 200 may be discharged to the outside of the main chamber 100 through the outlets 130. The center chamber 200 includes the second inner space 210, the afterburner 220, and the reformer 600 in one space, and thus the heat of the combustion gas generated by the afterburner 220 may be used to promote preheating and reforming of the fuel in the reformer 600.

The second inner space 210 is a space excluding the afterburner 220 and the reformer 600 inside the center chamber 200 and is filled with the high-temperature combustion gas discharged from the afterburner 220 while the fuel cell is operating. Thus, the combustion gas of the second inner space 210 may be heat-exchanged with the air-heat exchange unit 400 through a side wall of the center chamber 200 and may be also heat-exchanged with the reformer 600. As described above, the second inner space 210 may be connected to communicate with the outlets 130 so that the combustion gas may be discharged to the outside of the main chamber 100.

FIGS. 4 to 7 illustrate movement paths of the air, the fuel, and the combustion gas of the fuel cell hot box according to one specific embodiment of the present disclosure. Referring to FIGS. 4 to 7, the afterburner 220 may be provided on one side of the center chamber 200 on a vertical central axis, and the reformer 600 may be spaced apart from the afterburner 220 by a distance. The side surface of the afterburner 220 communicates with the plurality of fuel cell stack parts 300 through the first inner space 110, and the unreacted air having passed through the fuel cell stack parts 300 may be introduced into the side surface of the afterburner 220 through the first inner space 110. The unreacted fuel having passed through the fuel cell stack parts 300 is introduced into the afterburner 220 through a duct connecting an upper portion of the fuel cell stack parts 300 and the side surface of the afterburner 220. In this case, the concentration of fuel components in the unreacted fuel and air is low due to a large amount of $CO_2$ and $H_2O$ generated in the fuel cell stack part 300, and thus complete combustion using a general combustion manner is difficult. In order to solve this problem, the complete combustion of fuel can be promoted using a combustion catalyst of noble metals such as Pt and Ir. The introduced fuel and air may be combusted inside the afterburner 220 to generate the high-temperature combustion gas. The generated high-temperature combustion gas may be discharged to the second inner space 210, may promote preheating and reforming of the fuel and preheating of the air, and then may be discharged to the outside through the outlets 130 of the main chamber 100. The afterburner 220 may be provided with a fan for guiding the generated high-temperature combustion gas to be discharged into the second inner space 210.

The first guide member 230 is provided to extend vertically from a bottom surface of the center chamber 200 to surround the upper side surface of the reformer 600 in the center chamber 200. The first guide member 230 may guide the vertical movement of the reformer 600. The first guide member 230 may be formed in a shape corresponding to the shape of the upper side surface of the reformer 600.

The number of the fuel cell stack parts 300 accommodated in the first inner space 110 may be properly selected according to a performance condition required for the fuel cell hot box 10, and the positions of the accommodated fuel cell stack parts 300 may be properly selected according to a design condition. For example, when there are the plurality of fuel cell stack parts 300, the fuel cell stack parts 300 may be located at the same distance with respect to the center chamber 200 and may be arranged and accommodated to be spaced apart from each other at a predetermined interval. A great deal of heat is generated when a reaction occurs in the fuel cell stack part 300, and thus when the plurality of fuel cell stack parts 300 are accommodated, the fuel cell stack parts 300 may be arranged to be spaced apart from each other. Further, an angle between an axis perpendicular to a front surface of the fuel cell stack part 300 in which an air inlet is located and an axis perpendicular to a front surface of another fuel cell stack part 300 adjacent to the fuel cell stack part 300 may be constant in all the fuel cell stack parts 300.

In one specific embodiment, the first inner space 110 may be provided with a guide member (not illustrated) for guiding the accommodation position of the fuel cell stack part 300 and a fixing member (not illustrated) extending from the inner surface of the main chamber 100 to fix the fuel cell stack part 300 to the first inner space 110. The guide member may be a sliding guide that extends from the bottom surface at a predetermined height to be in contact with an edge of the fuel cell stack part 300 in a height direction and to guide the fuel cell stack part 300 in a sliding manner. The fixing member may be a coupling protrusion or coupling groove to be detachably coupled to the bottom surface of the fuel cell stack part 300. A coupling groove or coupling protrusion that may correspond to the coupling protrusion or coupling groove may be provided in the bottom surface of the fuel cell stack part 300. Further, a buffer member that may absorb external vibrations and shocks may be provided in an inner surface in which the fuel cell stack part 300 and the main chamber 100 are in contact with each other.

In another specific embodiment, the plurality of fuel cell stack parts 300 may be formed in various shapes. The present disclosure is not limited thereto, but for example, each of the fuel cell stack parts 300 may be formed in a square hexahedron.

Meanwhile, the fuel cell stack part 300 is formed by stacking and combining a plurality of cells each including an air electrode and a fuel electrode. Since the fuel cell stack part 300 according to the present disclosure is a stack used in a general fuel cell, a detailed structure thereof will be omitted.

The air-heat exchange unit 400 may be located between the plurality of fuel cell stack part 300 and the center chamber 200, may connect the first inlet 120 and the plurality of fuel cell stack parts 300 to communicate with each other and may be formed in a shape in which bent passages are repeatedly stacked. Further, the air-heat exchange unit 400 may be formed to surround the outer surface of the center chamber 200. The shape of the air-heat exchange unit 400 may increase the heat exchange area between the plurality of fuel cell stack parts 300 and the high-temperature center chamber 200, and thus the heat exchange can be effectively performed. Further, the air-heat exchange unit 400 may effectively cool the plurality of high-temperature fuel cell stack parts 300, thereby increasing the durability and lifetime of the plurality of fuel cell stack parts 300 which are core components of the fuel cell. Further, the air having passed through the air-heat exchange unit 400 may be heat-exchanged with the plurality of fuel cell stack parts 300 until the air is introduced into the plurality of fuel cell stack parts 300.

The auxiliary chamber 500 may be located to be spaced apart from a lower part of the main chamber 100 by a predetermined distance and have a third inner space 510 and a second inlet 520. The reformer 600 may be disposed at the center of the auxiliary chamber 500, and the fuel may be introduced into the reformer 600 through the second inlet 520. The auxiliary chamber 500 is disposed so that a vertical central axis thereof coincides with the vertical central axis of the main chamber 100 and also coincides with a vertical central axis of the reformer 600, and thus all of the vertical central axes of the auxiliary chamber 500, the main chamber 100, and the reformer 600 may have the same vertical central axis. The reformed fuel may be introduced into the third inner space 510 from the reformer 600. The auxiliary chamber 500 may surround the lower surface of the reformer 600 to fix a sliding direction so that the reformer 600 may slide only in a vertical direction. The auxiliary chamber 500 may separate the third inner space 510 and a hollow part 610 from each other through a third guide member 540 to separate the fuel introduced into the auxiliary chamber 500 and the reformed fuel discharged from the reformer 60 from each other.

The third inner space 510 is a space into which the reformed fuel passing through the reformer 600 and then discharged from the reformer 600 is introduced, and may be formed in the auxiliary chamber 500. The third inner space 510 is connected to the plurality of fuel cell stack parts 300 through the connection pipe 550 so that the reformed fuel is introduced into the plurality of fuel cell stack parts 300.

The second inlet 520 is a component into which the fuel is introduced, may be formed in the auxiliary chamber 500, and may be preferably formed in a center of the lower surface of the auxiliary chamber 500. Thus, since the second inlet 520 is located coaxially with the inlet of the reformer 600, the fuel introduced into the second inlet 520 may be directly introduced into the reformer 600. The fuel may be methane, gasoline, biogas, methanol, ethanol, or the like in addition to hydrogen. A fuel supply device for effectively injecting the fuel may be connected to the second inlet 520.

The second guide member 530 may be a member provided in the auxiliary chamber 500 to guide the vertical movement of the reformer 600. The second guide member 530 is a member extending vertically from the auxiliary chamber 500 to surround a lower side surface of the reformer 600. The second guide member 530 may be formed in a shape corresponding to the shape of a lower portion of the reformer 600. The lower portion of the reformer 600 may vertically move while sliding along the second guide member 530. Further, the fuel discharged from the reformer 600 may be guided to move to the third inner space 510.

The third guide member 540 is a member in contact with a reforming part 620 surrounding the hollow part 610 of the reformer 600 and extending in a lengthwise direction along the vertical central axis of the auxiliary chamber 500 and may guide a vertical sliding movement of the reformer 600 in cooperation with the second guide member 530. The third guide member 540 may be formed in a shape that corresponds to the shape of the surface surrounding the hollow part 610 and that is in contact with the reforming part 620. The reforming part 620 of the reformer 600 may be inserted into a space formed due to the second guide member 530 and the third guide member 540 being spaced apart from each other by a predetermined interval. The second guide member 530 and the third guide member 540 may be located so that the vertical central axes thereof coincide with each other. The third guide member 540 may separate a space of the auxiliary chamber 500 into the third inner space 510 and an inner space of the third guide member 540 to separate the fuel introduced into the auxiliary chamber 500 and the reformed fuel discharged from the reformer 600.

The connection pipe 550 may connect the auxiliary chamber 500 and the main chamber 100 to communicate with each other and, more specifically, may connect the third inner space 510 and the plurality of fuel cell stack parts 300 to communicate with each other. Thus, the reformed fuel may be introduced into the plurality of fuel cell stack parts 300 through the connection pipe 550.

Figure 8:
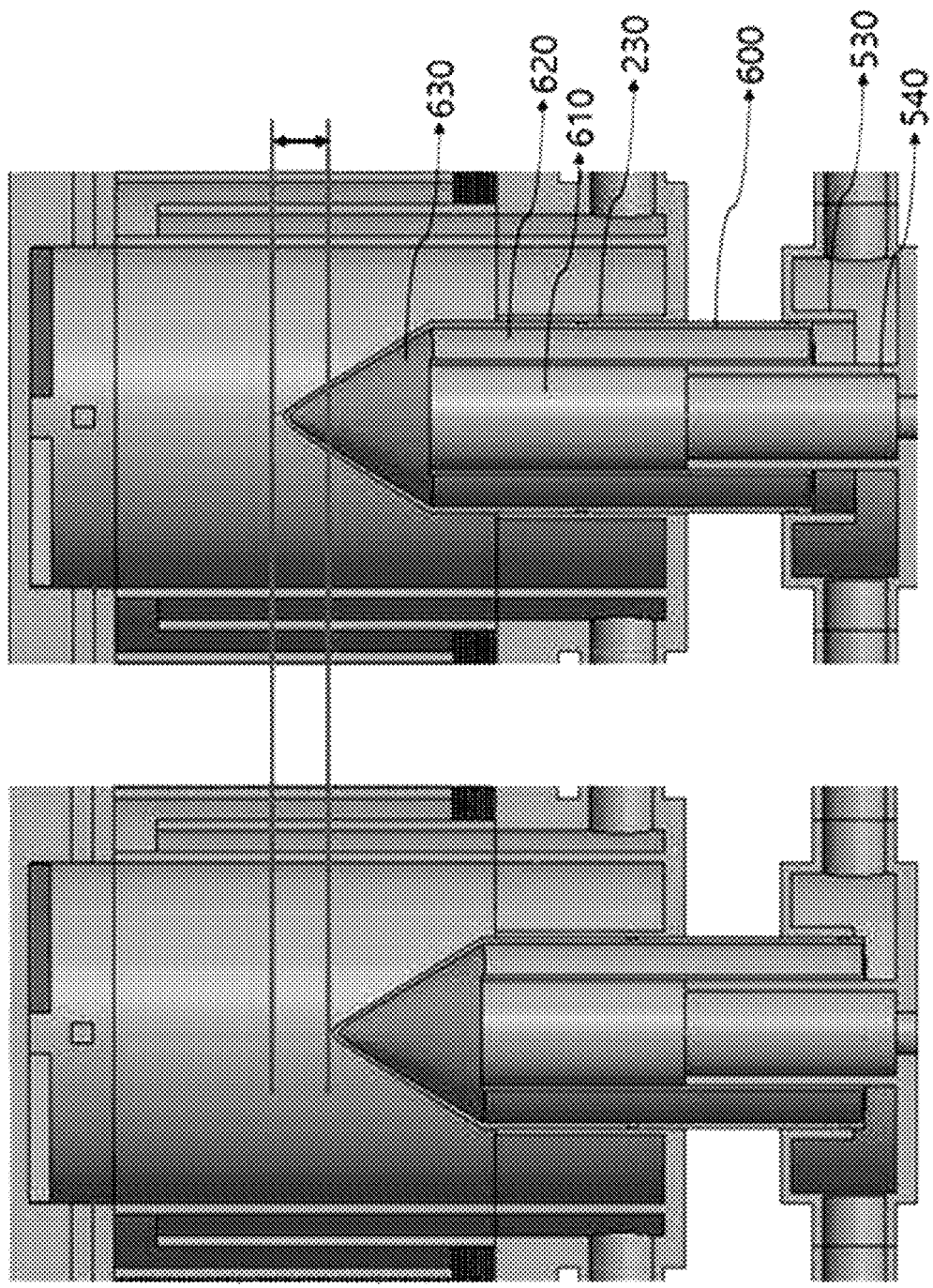
FIG. 8 is a view illustrating vertical movement of a reformer in the fuel cell hot box according to one embodiment of the present disclosure.

FIG. 8 is a view illustrating vertical sliding movement of the reformer in the fuel cell hot box according to one embodiment of the present disclosure. Referring to FIG. 8, the reformer 600 changes a chemical structure so that the fuel introduced through the second inlet 520 is advantageously used in the fuel cell and may be located at the center of the auxiliary chamber 500 so that the vertical central axis of the reformer 600 coincides with that of the auxiliary chamber 500, and at least a portion of an upper part of the reformer 600 may be located in the second inner space 210. The upper part of the reformer 600 located in the second inner space 210 may be spaced apart from an inner side wall of the center chamber 200 by a predetermined distance. The reformer 600 may vertically slide in directions guided by the first guide member 230, the second guide member 530, and the third guide member 540. When the reformer 600 slides and moves upward, a partial area of the upper part of the reformer 600 located in the second inner space 210 increases, and thus an area in contact with the high-temperature combustion gas may increase. When the area in contact with the combustion gas increases, a heat exchange area may increase, thereby improving a reforming rate and increasing a preheated temperature. Further, since a time during which the fuel remains in the reformer 600 increases and a separation distance from the afterburner 220 is reduced, the reforming is promoted to improve the reforming rate and increase the preheated temperature. Thus, the reformer 600 slides and moves vertically according to an operation state of the fuel cell, and thus the reforming rate of the fuel can be flexibly controlled. Further, the fuel introduced from the outside of the main chamber 100 may be preheated and reformed without additional supply of energy, thereby increasing the overall efficiency of a system. The reformer 600 may include the hollow part 610 having a hollow formed in the center thereof, the reforming part 620 surrounding the hollow part 610, and a cover part 630 located above the hollow part 610 and the reforming part 620.

The hollow part 610 is a hollow formed along the vertical central axis of the reformer 600 and is surrounded by the reforming part 620. While the fuel passing through the second inlet 520 is introduced into the reformer 600 and passes through the hollow part 610, the temperature of the fuel may be increased to a temperature required for the reforming. A vertical central axis of the hollow part 610 may coincide with a vertical central axis of the second inlet 520. The hollow part 610 may be provided with a reforming catalyst that promotes the reforming reaction of the fuel. The reforming catalyst is not limited thereto but may be, for example, Ni, Rh, Ru, Pt, or the like.

The reforming part 620 may be formed to surround the hollow part 610 so that the fuel passing through the hollow part 610 may be heat-exchanged with the combustion gas while moving in a lengthwise direction. Thus, the reforming part 620 may increase the temperature of the fuel and reform the fuel. The reforming catalyst that catalyzes the reaction of the fuel may be provided inside the reforming part 620. The reforming catalyst is not limited thereto but may be, for example, Ni, Rh, Ru, Pt, or the like. When the reformer 600 slides upward, a portion included in the second inner space 210 among the reforming part 620 increases, thereby improving the reforming rate of the fuel and further increasing the preheated temperature.

The cover part 630 is a place for changing a direction of the fuel so that the fuel introduced into the reformer 600 is introduced into the reforming part 620, and the shape of the cover part 630 is not limited. The cover part 630 may have a space of a certain size formed therein. The reforming catalyst that catalyzes the reforming reaction of the fuel may be provided in the inner space of the cover part 630. The reforming catalyst is not limited thereto but may be, for example, Ni, Rh, Ru, Pt, or the like. The temperature of the fuel moving in the inner space of the cover part 630 may be increased while being heat-exchanged with the combustion gas.

The fuel cell hot box may further include a control rod 640. The control rod 640 may be connected to the reformer 600, protrude to the outside of the hot body, and adjust vertical sliding movement of the reformer 600. The control rod 640 may be connected to a driving device to vertically slide the reformer 600.

In one specific embodiment, the driving device may include a cam and a camshaft. In the cam and camshaft driving device, when the cam fixedly coupled to a distal end of the camshaft rotates, a displacement of a point at which the cam and the control rod 640 are in contact with each other is vertically changed according to the shape of the cam, and thus the control rod 640 may also be driven vertically.

In another specific embodiment, the driving device may include a rack gear and a pinion gear. The pinion gear and the rack gear are engaged with each other, and when the rack gear rotates the pinion gear, the rack gear engaged with the pinion gear may move linearly in a lengthwise direction. Thus, when the control rod 640 and the rack gear are connected and the rack gear is aligned to move vertically and linearly, the control rod 640 may be vertically driven according to the forward/rearward rotation of the pinion gear.

In still another specific embodiment, the driving device may include an actuator. The actuator may vertically drive the control rod 640 using electricity, hydraulic pressure, or pneumatic pressure.

FIG. 9 is a view illustrating first and second sealing members of the fuel cell hot box according to one specific embodiment of the present disclosure. Referring to FIG. 9, the reformer 600 may include a first sealing member 650 along a circumference of the side surface thereof in contact with the first guide member 230. The first sealing member 650 may prevent after-burning gas from leaking through a narrow gap between the first guide member 230 and the reformer 600, thereby minimizing heat loss and may be provided as a plurality of first sealing members 650. The first sealing member 650 may be a ring-shaped gasket and may be made of a heat-resistant alloy material based on an Ni group, an Ni—Fe group, or a Co group, which is a heat-resistant material, to withstand the high-temperature combustion gas.

The reformer 600 may include a second sealing member 660 along a circumference of the side surface thereof in contact with the second guide member 530. The second sealing member 660 may prevent the reformed fuel from leaking through a narrow gap between the second guide member 530 and the reformer 600 and may be provided as a plurality of second sealing members 660. The second sealing member 660 may be a ring-shaped gasket and may be made of a heat-resistant alloy material based on an Ni group, an Ni—Fe group, or a Co group, which is a heat-resistant material, to withstand the high-temperature combustion gas.

Figure 10:
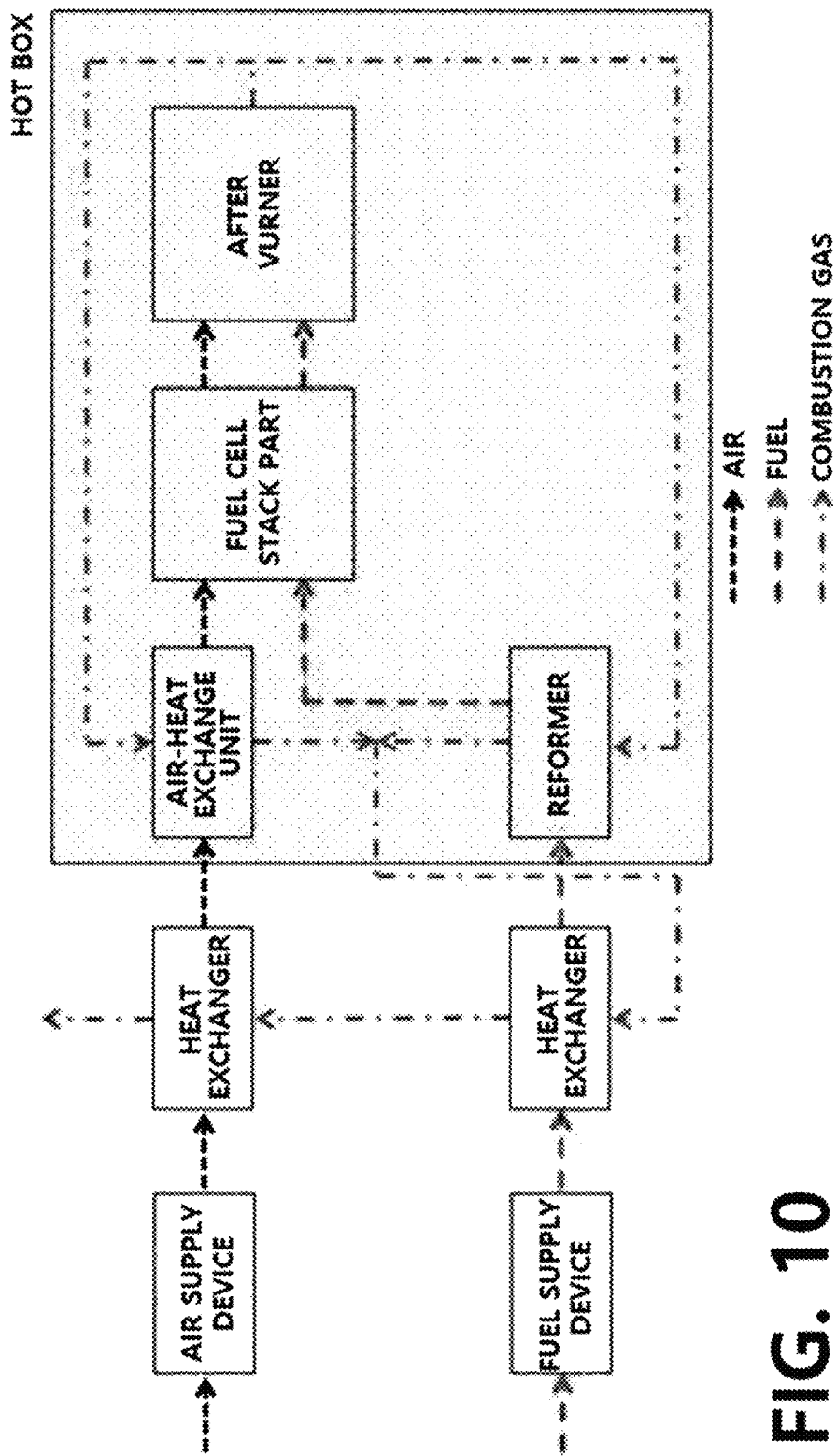
FIG. 10 is a sequence diagram illustrating the movement paths of the fuel, the air, and the combustion gas according to one embodiment of the present disclosure.

FIG. 10 is a sequence diagram illustrating the movement paths of the fuel, the air, and the combustion gas according to one embodiment of the present disclosure. Referring to FIG. 10, the air is primarily preheated through a heat exchanger outside the fuel cell hot body by the air supply device, is secondarily preheated by the heat of the high-temperature combustion gas discharged from the afterburner 220 and the heat of the fuel cell stack part 300 when being introduced into the air-heat exchange unit 400 through the first inlet 120 and is then introduced into the fuel cell stack part 300. The fuel is primarily preheated through the heat exchanger outside the fuel cell hot box by the fuel supply device and is then secondarily preheated by the heat of the combustion gas discharged from the afterburner 220 when being introduced into the reformer 600 through the second inlet 520. In this case, the fuel may be reformed in the reformer 600 together so that the fuel may be utilized in the fuel cell stack part 300. The air and the reformed fuel introduced into the fuel cell stack part 300 react to produce water, electricity, heat, and the like, and the unreacted air and the unreacted fuel pass through the fuel cell stack part 300 and are introduced into the afterburner 220. The introduced unreacted air and the introduced unreacted fuel generate high-temperature combustion gas through a combustion reaction, and the high-temperature combustion gas preheats the fuel in the reformer 600 and the air in the air-heat exchange unit 400 while passing through the first inner space 110 of the center chamber 200 and is discharged to the outside of the main chamber 100 through the outlet 130. In this way, since the combustion gas generated by the afterburner 220 is not directly discharged to the outside of the main chamber 100 and the air and the fuel are continuously preheated using the heat of the combustion gas, efficiency of the entire system can be improved.

A solid oxide fuel cell hot box according to the present disclosure can reform fuel using heat of a fuel cell stack part and heat of combustion gas and, at the same time, preheat air and the fuel without using additional energy, thereby improving overall system efficiency.

Further, through the construction of a vertical movement mechanism of a reformer, a heat exchange area is changed according to the position of the reformer, and thus a reforming rate of the fuel can be controlled in a predetermined manner, thereby improving the flexibility of the entire system.

Further, the high-temperature fuel cell stack part vulnerable to thermal stress is disposed to be effectively heat-exchanged with low-temperature air, and thus the thermal stress of the fuel cell stack part can be alleviated. Accordingly, a reaction speed and a temperature of the fuel cell stack part can be adjusted, the durability and performance degradation rate of the fuel cell stack part is reduced, and thus a lifetime of the fuel cell stack part can be improved.

Although the present technology has been described through the above embodiments, the present technology is not limited thereto. The above embodiments may be modified or changed without departing from the spirit and scope of the present technology, and those skilled in the art can recognize that such modifications and changes also belong to the present technology.

What is claimed is:

1. A fuel cell hot box comprising:
   a main chamber that has a first inner space, a first inlet into which air is introduced, and an outlet formed therein;
   a center chamber that is located at a center of the first inner space and has a second inner space formed therein;
   an auxiliary chamber that is located to be spaced apart from the main chamber and has a third inner space and a second inlet, into which fuel is introduced, formed therein; and
   a reformer which is disposed at a center of the auxiliary chamber, of which at least a portion of an upper part is located in the second inner space, and which is configured to be vertically slidable,
   wherein the main chamber includes a plurality of fuel cell stack parts and an air-heat exchange unit,
   each of the fuel cell stack parts is disposed outside the center chamber with respect to the center chamber,
   the fuel cell stack parts are spaced apart from each other,
   the air-heat exchange unit is located between the plurality of fuel cell stack parts and the center chamber to connect the plurality of fuel cell stack parts and the first inlet,
   an afterburner communicating with each of the fuel cell stack parts is included in one side of the center chamber,
   the auxiliary chamber is connected to the main chamber through a connection pipe,
   combustion gas burned by the afterburner is discharged to an outside of the main chamber through the outlet, and
   the reformer is connected to the second inlet and disposed to be spaced apart from the afterburner.

2. The fuel cell hot box of claim 1, wherein the fuel introduced through the second inlet is introduced into the reformer and then supplied to the plurality of fuel cell stack parts along the connection pipe, and
   a temperature of the fuel introduced into the reformer is increased by heat exchange with the combustion gas existing in the second inner space by means of the reformer.

3. The fuel cell hot box of claim 2, wherein a reforming rate of the reformer is adjustable by adjusting a vertical sliding movement of the reformer.

4. The fuel cell hot box of claim 2, wherein the reformer includes:
   a hollow part that is connected to the second inlet and has a hollow formed therein;
   a reforming part that surrounds the hollow part; and
   a cover part that connects the hollow part and the reforming part and changes a direction of the fuel introduced into the hollow part to be introduced into the reforming part.

5. The fuel cell hot box of claim 2, wherein unreacted fuel of the fuel passing through the plurality of fuel cell stack parts is introduced into the afterburner.

6. The fuel cell hot box of claim 5, wherein unreacted fuel is introduced into the afterburner through a duct connecting upper portions of the plurality of fuel cell stack parts and a side portion of the afterburner.

7. The fuel cell hot box of claim 1, wherein the auxiliary chamber is disposed so that a vertical central axis thereof coincides with that of the main chamber.

8. The fuel cell hot box of claim 1, wherein the center chamber includes a first guide member vertically extending to surround an upper surface of the reformer, and the first guide member guides vertical movement of the reformer.

9. The fuel cell hot box of claim 1, wherein the auxiliary chamber includes a second guide member vertically extending to surround a lower side surface of the reformer, and the second guide member guides vertical movement of the reformer.

10. The fuel cell hot box of claim 1, wherein the hot box further includes a control rod, and the control rod is connected to the reformer, protrudes outward from the hot box, and adjusts vertical movement of the reformer.

11. The fuel cell hot box of claim 10, wherein the control rod is connected to a driving device, and the driving device vertically moves the reformer using the control rod.

12. The fuel cell hot box of claim 1, wherein a side surface, which is in contact with a first guide member, of the reformer is surrounded by a first sealing member.

13. The fuel cell hot box of claim 1, wherein a side surface, which is in contact with a second guide member, of the reformer is surrounded by a second sealing member.

14. The fuel cell hot box of claim 1, wherein the air introduced into the air-heat exchange unit through the first inlet is preheated by heat of the combustion gas and heat generated by the plurality of fuel cell stack parts and is then introduced into the plurality of fuel cell stack parts.

15. The fuel cell hot box of claim 14, wherein the air-heat exchange unit has a bent passage to connect the first inlet and the plurality of fuel cell stack parts, and the bent passage extends in one direction, is then bent to change the one direction, and extends in the other one direction opposite to the one direction.

16. The fuel cell hot box of claim 14, wherein unreacted air of the air passing through the plurality of fuel cell stack parts is introduced into the afterburner.

17. The fuel cell hot box of claim 1, wherein the plurality of fuel cell stack parts are located at the same distance from a center of the center chamber and arranged in the first inner space at regular intervals.

* * * * *